United States Patent [19]
Alexander

[11] Patent Number: 5,184,837
[45] Date of Patent: Feb. 9, 1993

[54] WHEELCHAIR

[76] Inventor: Tracey S. Alexander, 5450 N. Cumberland Dr., Tucson, Ariz. 85704

[21] Appl. No.: 566,507

[22] Filed: Aug. 13, 1990

Related U.S. Application Data

[63] Continuation of Ser. No. 151,003, Feb. 1, 1988, abandoned.

[51] Int. Cl.⁵ .......................... B62M 1/14; B62M 1/16
[52] U.S. Cl. .............................. 280/250.1; 280/242.1; 280/244
[58] Field of Search ............... 280/250.1, 304.1, 238, 280/244, 248, 242.1, 249, 236; 188/24.18, 24.12

[56] References Cited

U.S. PATENT DOCUMENTS

| | | | |
|---|---|---|---|
| 735,113 | 8/1903 | Kelland et al. | 188/24.18 |
| 838,228 | 12/1906 | Williams | 200/250.1 |
| 3,869,146 | 3/1975 | Bulmer | 280/250.1 |
| 4,283,069 | 8/1981 | Citelli | 280/236 |
| 4,682,784 | 7/1987 | Anderson | 280/250.1 |

Primary Examiner—Mitchell J. Hill
Attorney, Agent, or Firm—Benman & Collins

[57] ABSTRACT

An improved wheelchair which allows the wheelchair occupant to travel easier and faster over varied terrain, for longer distances and in a more sanitary environment. The invention includes a wheel for providing rolling ability to the wheelchair. A support is connected to the wheel for supporting the occupant of the wheelchair. A drive assembly is included for applying rotational force to the wheel. The drive assembly includes a gearing assembly for varying the ratio of rotational movement of the wheel to the movement of the drive assembly.

11 Claims, 3 Drawing Sheets

WHEELCHAIR

This is a continuation of application Ser. No. 151,003, filed Feb. 1, 1988, now abandoned.

BACKGROUND OF THE INVENTION

1. Field of the Invention

The present invention relates to wheelchairs. More specifically, the present invention relates to manually powered wheelchairs.

While the present invention is described herein with reference to a particular embodiment for an illustrative application, it is understood that the invention is not limited thereto. Those having ordinary skill in the art and access to the teaching provided herein will recognize additional modifications, applications and embodiments within the scope thereof.

2. Description of the Related Art

Conventional manual wheelchairs have a rim, concentric to the wheel, by which the occupant manually propels the wheelchair. The hands of the wheelchair occupant apply a frictional force to the rim of the wheelchair to stop or slow the wheelchair.

There are several shortcomings associated with conventional manual wheelchairs. An occupant of a conventional wheelchair must typically expend considerable energy to travel on rough terrain or up hills or ramps. On steep ramps, the force required for propulsion or stopping may exceed the strength or stamina of the occupant. Stopping or slowing wheelchairs of current design can be quite difficult and trips of long distances may result in considerable fatigue.

Further, the rim of the wheelchair may be at a high or a low temperature extreme, depending on the weather conditions. In addition, the hands of the wheelchair occupant may become soiled as the wheels of the wheelchair are typically contaminated by dirt, oil, debris and even animal feces from the sidewalks, streets and other surfaces over which the wheelchair rolls. This is unsightly, uncomfortable, unsanitary and could lead to infection.

In propelling a wheelchair of current design, the user must often pivot his or her body forward. This may cause the loss of horizontal lap stability making it difficult to travel with objects such as a cup of coffee or a tray of food on one's lap.

While motorized wheelchairs address these problems, motorized wheelchairs are expensive, difficult to transport from location to location and virtually impossible for the wheelchair user to unload without the aid of another individual or expensive mechanical equipment. Also, the use of a motorized wheelchair typically results in muscle atrophy of the wheelchair occupant, and thus further disability.

There is therefore a recognized need in the art for a manual or non-motorized mechanism for wheelchairs which provides a mechanical advantage over the current wheelchair designs. Ideally, the mechanism will permit the wheelchair occupant to propel the wheelchair over varied terrain and distances, while the hands of the occupant remain clean and comfortable.

Preferably, the mechanism would offer a variable mechanical advantage whereby the ratio of wheel movement to arm movement can be one-to-one or selected to be different from one-to-one depending on the nature and grade of the terrain as well as the stamina and strength of the wheelchair occupant. For example, the mechanism would permit a ratio of wheel movement to arm movement of less than the one-to-one ratio of conventional wheelchairs for travel up hills, ramps and other terrain that is typically difficult to traverse such that the momentary effort required by the occupant of the wheelchair is greatly reduced from that required in a wheelchair of conventional design. Similarly, a ratio of greater than one-to-one could be chosen for faster travel than is possible with wheelchairs of current design over that terrain which is generally easy to cross. In addition, a neutral position could be provided such that the wheel receives no rotational force from movement of the mechanism.

There is a further need for a wheelchair braking mechanism which will allow the wheelchair occupant to effectively stop or slow the wheelchair more easily than is possible in a wheelchair of current design, while keeping the hands of the occupant clean, comfortable and safe from harm. There is a special need for such a braking mechanism where long ramps or steep walk ways are encountered, or whenever greater stopping force is required.

SUMMARY OF THE INVENTION

The need in the art is substantially addressed by the improved wheelchair drive mechanism of the present invention. The invention provides a means for easier and faster travel on varied terrain and for longer distances, and for more flexible manual control of the wheelchair, while the hands of the wheelchair occupant are kept clean and comfortable. The improved wheelchair of the present invention includes a wheel means for providing rolling ability to said wheelchair, a support means connected to said wheel means for supporting the occupant of said wheelchair and a lever means for applying rotational force to said wheel means. In a specific embodiment of the invention, an improved wheelchair with multiple ratios of wheel movement to arm movement is disclosed. Furthermore, a mechanical wheelchair braking means is revealed.

DESCRIPTION OF THE INVENTION

Figure 1:
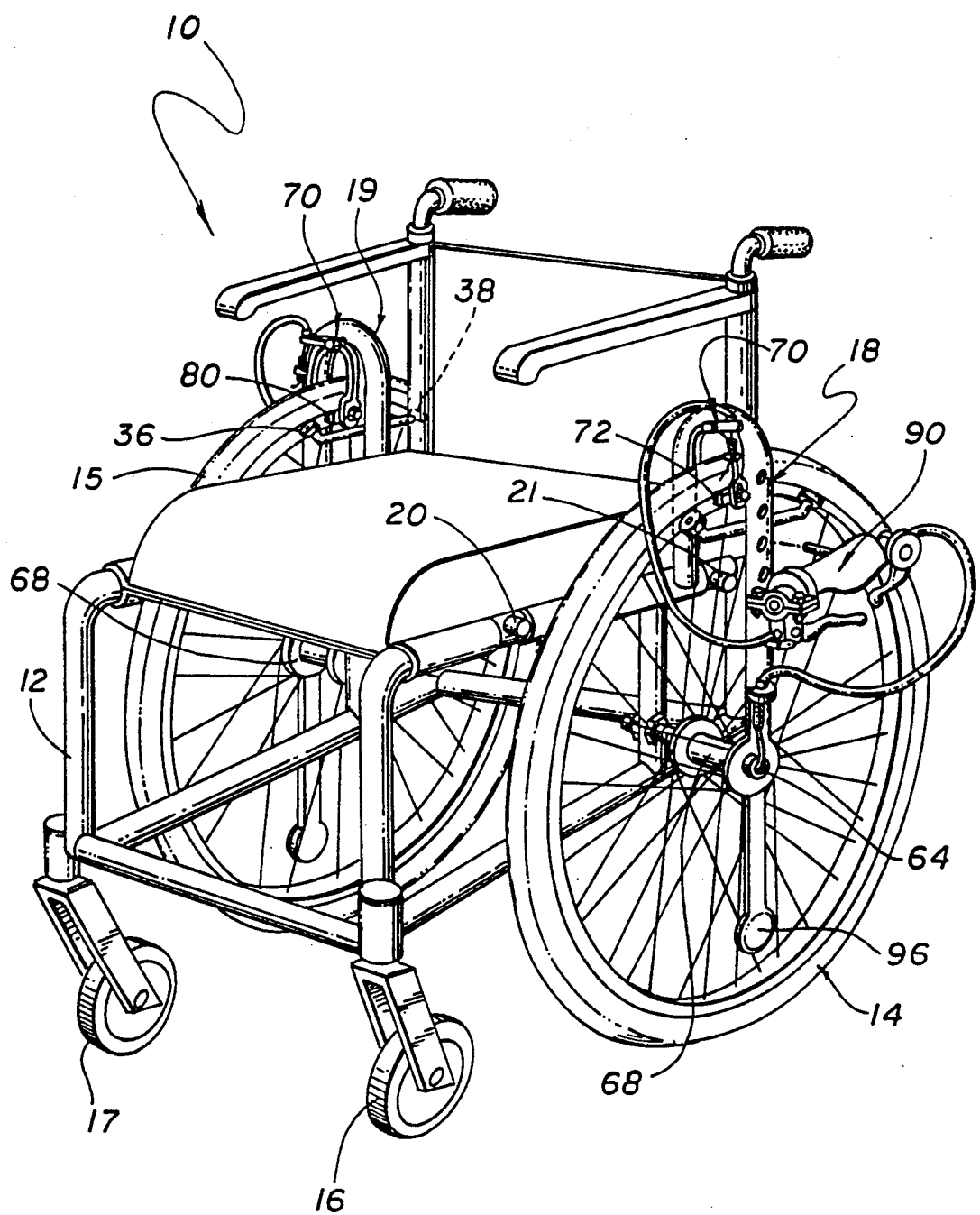
FIG. 1 is a perspective view of an improved wheelchair constructed in accordance with the teachings of the present invention.

An illustrative embodiment of an improved wheelchair 10 constructed in accordance with the teachings of the present invention is shown in FIG. 1 in perspective. The wheelchair 10, includes a support assembly 12 mounted on two drive wheels 14 and 15 and two support wheels 16 and 17. Drive mechanisms 18 and 19 are attached to drive wheels 14 and 15 respectively. The present invention allows for the wheelchair 10 to be propelled by movement of the drive mechanisms 18 and 19.

Figure 2:
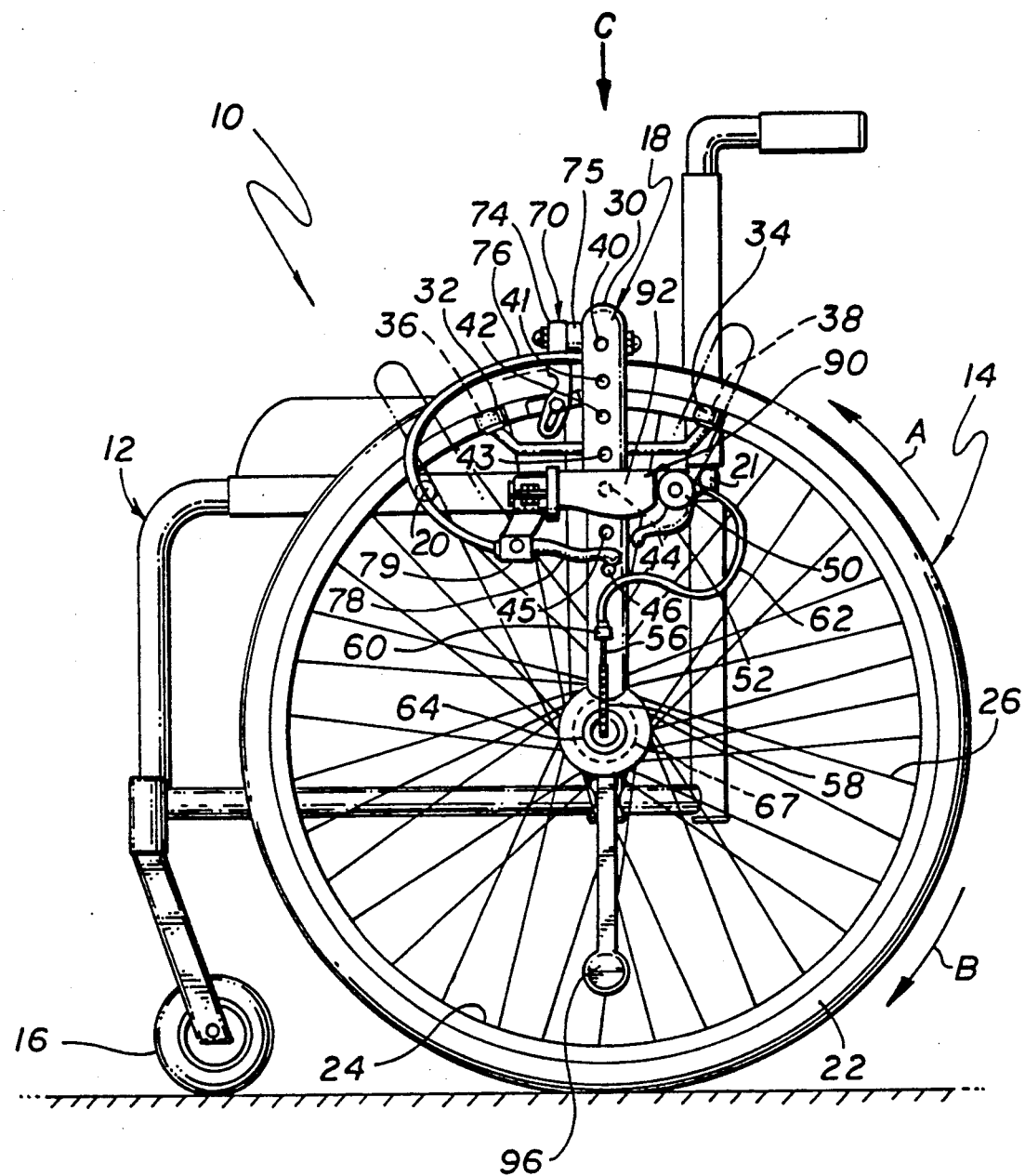
FIG. 2 shows a left side view of an improved wheelchair constructed in accordance with the teachings of the present invention.

FIG. 2 is a left side view of the wheelchair 10. The left hand drive mechanism 18 is shown in FIG. 2. The right hand drive mechanism 19, shown only in FIG. 1, differs from the left hand drive mechanism 18 only in that the right hand drive mechanism 19 is adapted for use on the right side of the wheelchair. Drive mechanisms 18 and 19 include a handle assembly 90. As shown in FIG. 2, rotational motion of the handle assembly 90 of drive mechanism 18 in direction A, will cause a rotational force also in direction A to be applied to the drive wheel 14. Rotational motion of the handle assembly 90 in direction B, to the return position of point C, will cause substantially no force to be applied to the drive wheel 14. Actuation of the drive mechanism 19 to provide rotation to the drive wheel 15 requires rotational movement of the drive mechanism 19 in a clockwise rotation, rather than the counter-clockwise rotation of the drive mechanism 18 that provided rotation to the drive wheel 14. Thus, forward motion of the wheelchair 10 results from counter-clockwise rotation of the drive mechanism 18 and clockwise rotation of the drive mechanism 19.

Each drive mechanism 18 and 19 includes a gearing mechanism 67. The gearing mechanism 67 includes a gear assembly 68 which is a hub containing planetary gears, levers and other devices. One such hub is the Sturmey Archer from England. Multiple spokes 26 connect the tire 22 and rim 24 of each drive wheel 14 and 15 to the associated gearing mechanism 67. Those skilled in the art will recognize that the gearing arrangement and the hub size may vary without departing from the scope of the present invention.

A gear selection mechanism 50 is mounted on handle 92 of the handle assembly 90. The gear selection mechanism 50 includes a gear shift lever 52. The gear shift lever 52 is coupled to the gear assembly 68 by a shielded cable portion 62, an unshielded cable portion 54 and by a chain 58. Shielded cable portion 62 and unshielded cable portion 54 are clamped to the handle assembly 90 by cable mount 60. The unshielded cable portion 54 is connected to chain 58 by cable clamp 56. The chain 58 enters the gear assembly 68 through a conduit 64.

Gear selection is effected by the movement of the gear shift lever 52. This movement is transferred to the gear assembly 68 by the shielded cable portion 62, the unshielded cable portion 54 and by the chain 58. The desired gear is selected by moving the gear shift lever to a designated position. The gear that is selected determines the ratio of drive wheel 14 or drive wheel 15 rotation to handle assembly 90 movement. It will be appreciated by those skilled in the art that the type of gear system and the number of gears may vary without departing from the scope of the present invention.

Those skilled in the art will recognize that the direction of rotation of the handle assembly 90 for movement of the drive wheel 14 or 15 can vary without departing from the scope of the present invention. Also, the wheelchair 10 could include a means for switching the direction of motion of the handle assembly 90 needed to obtain rotation of the drive wheel 14 or 15, or the wheelchair 10 could include a means for obtaining no rotation of the drive wheel 14 or 15 upon any rotation of the handle assembly 90 without departing from the scope of the present invention.

Figure 3:
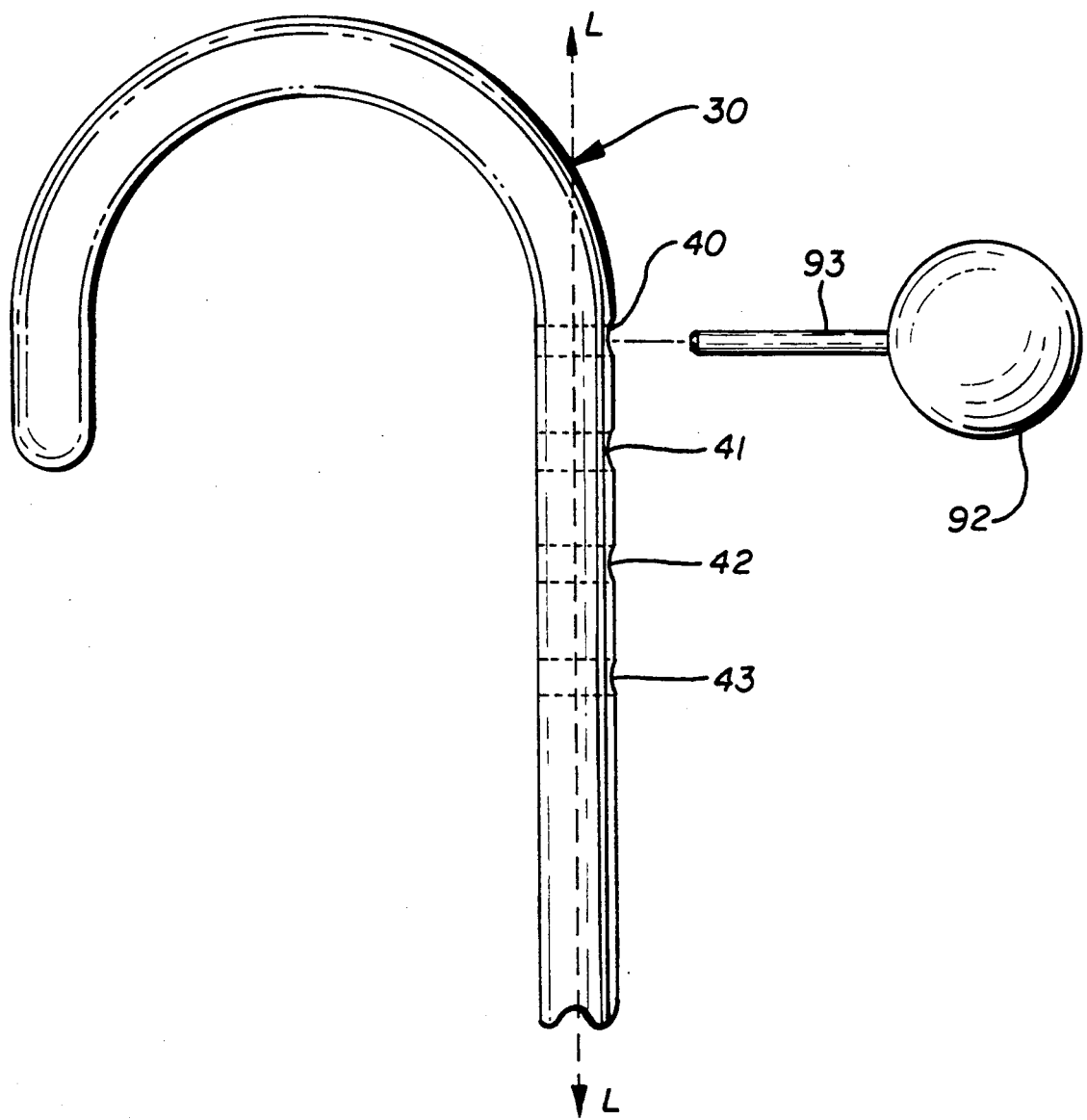
FIG. 3 is a simplified front view of the handle and lever utilized in the present invention.

Handle assembly 90 includes a handle 92 connected to a lever 30. As illustrated in the simplified front view of FIG. 3, the handle 92 includes a tab 93 for insertion and removal into and out of a selected circular mounting location 40-43 on the lever 30. The lever 30 has a longitudinal axis L—L extending therethrough. The handle 92 can be selectively mounted in any of the handle mounting locations 40, 41, 42, 43, 44, 45 or 46 such that the handle 92 pivots about the selected handle mounting location. The lever 30 connects to the gearing mechanism 67 such that force applied to the handle 92 transfers to the gearing mechanism 67 to effect rotation of the drive wheel 14 or 15.

The lever 30 contains a counterbalance 96 to return the lever 30 to a center position when no force is applied to the lever 30. In some wheelchair configurations, limitations on handle assembly 90 movement may be desired. For these cases, stops 20 and 21 are attached to the support assembly 12 of the wheelchair 10 to prevent the handle assembly 90 from moving past the locations of the stops 20 and 21.

Thus, it will be appreciated by those skilled in the art that movement of the drive mechanisms 18 and 19 will impart motion to the wheelchair 10 with the speed of the wheelchair 10 being determined by the gears that are selected and by the positions of each handle 92 in each lever 30. It will also be appreciated by those skilled in the art that the number of mounting positions for handle 92 on lever 30 may vary including containing means for allowing infinite mounting positions without departing from the scope of the present invention It follows that what is now needed is a means for slowing or stopping the wheelchair 10. The braking mechanism 70 provides this means. The braking mechanism 70 includes brake arm 74 connected to brake pad 72 on the outside of each drive mechanism 18 and 19 and brake arm 75 connected to brake pad 80 on the inside of each drive mechanism 18 and 19. The braking mechanism 70 is controlled by a brake lever 78 which is mounted on handle 92 of the handle assembly 90. A brake cable 76 connects the brake lever 78 to the braking mechanism 70. The braking mechanism 70 is mounted on the lever 30 of the handle assembly 90 as shown in FIG. 2. Operation of the brake lever 78 will cause the brake arms 74 and 75 to bring the brake pads 72 and 80 into contact with the rim 24 of the drive wheel 14 or 15 effectively slowing or stopping the wheelchair 10.

Guide wheels 32, 34, 36 and 38 are also mounted on the lever 30. The guide wheels 32, 34, 36 and 38 contact the rim 24 of each drive wheel 14 and 15 to stabilize the handle assembly 90 and maintain a predetermined distance between the lever 30 and each drive wheel 14 or 15, ensuring that the brake pads 72 and 80 contact the rim 24 of each drive wheel 14 or 15 only when the brake lever 78 is operated.

A hook 79 is provided so that the braking mechanism 70 may be locked in an actuated position. By depressing the brake lever 78, the hook 79 may be moved into a position behind brake lever 78. The hook 79 will then keep the braking mechanism in an actuated position ensuring that the brake pads 72 and 80 are in constant contact with the rim 24 of the desired drive wheel 14 or 15. When the braking mechanism 70 is locked in an actuated position, the braking mechanism 70 is a parking brake.

It will be appreciated by those skilled in the art that the type of braking system and the number of brakes may vary without departing from the scope of the present invention. For example, a disc brake system could be used wherein a rotor is mounted on each drive wheel 14 and 15 and brake calipers are mounted on each lever 30. Or, the gearing mechanism 67 could include a brake means whereby motion of the drive mechanism 18 or 19 in a first direction will apply rotational force to the drive wheel 14 or 15 respectively, no motion of the drive mechanism 18 or 19 will apply substantially no rotational force to the drive wheel 14 or 15 respectively and motion of the drive mechanism 18 or 19 in a second direction will reduce the rotational speed of the drive wheel 14 or 15 respectively to slow or stop the wheelchair 10. In addition, other means for stabilizing the handle assembly 90 may be employed without departing from the scope of the present invention.

While the present invention has been described herein with reference to an illustrative embodiment and a particular application, it is understood that the invention is not limited thereto. Those having ordinary skill in the art and access to the teachings of the present invention will recognize additional modifications and applications within the scope thereof.

For example, the present invention is not limited to a multi-speed wheelchair, but could include a single speed wheelchair. In addition, the wheelchair 10 could be modified such that operation of the wheelchair 10 including the drive mechanisms and the mechanical brakes would require the occupant to use only a single arm.

It is therefore intended by the appended claims to cover any and all such modifications, applications and embodiments.

Accordingly,
What is claimed is:

1. An improved wheelchair comprising:
   wheel means for providing rolling ability for said wheelchair, said wheel means having at least one wheel;
   support means connected to said wheel means for supporting the occupant of said wheelchair; and
   means for applying rotational force to said wheel means including handle means for receiving an application of force causing rotational movement to said wheel means, said handle means including a handle connected to a lever, and said lever including counterbalance means for returning said lever to a predetermined position when no force is applied thereto.

2. The improved wheelchair of claim 1 wherein said handle means includes at least one guide wheel such that said guide wheel contacts said wheel means to maintain a predetermined clearance between said wheel means and said lever.

3. The improved wheelchair of claim 2 wherein said support means includes stop means for limiting the movement of said handle means.

4. An improved wheelchair comprising:
   wheel means for providing rolling ability for said wheelchair, said wheel means having at least one wheel;
   support means connected to said wheel means for supporting the occupant of said wheelchair; and
   lever means for applying rotational force to said wheel means, said lever means including a lever connected to said wheel means, said lever having a longitudinal axis and a plurality of circular mounting locations along the longitudinal axis thereof, and a handle having a tab for cooperative pivotal engagement of said handle in one of said circular mounting locations.

5. The improved wheelchair of claim 4 wherein said lever means includes a manually actuated braking means for reducing the rotational speed of said wheel means.

6. The improved wheelchair of claim 5 wherein said braking means includes at least one brake control and having at least one brake mechanism per drive wheel.

7. The improved wheelchair of claim 6 wherein said brake control includes a locking means for maintaining said brake control in a locked and set position.

8. The improved wheelchair of claim 6 wherein said brake control includes a brake lever and said brake mechanism includes brake pads attached to a brake caliper wherein said brake caliper moves said brake pads into a position of contact with said wheel means upon manually depressing said brake lever.

9. The improved wheelchair of claim 4 wherein said lever includes counterbalance means for returning said lever to a predetermined position when no force is applied thereto.

10. The improved wheelchair of claim 4 wherein said handle includes at least one guide wheel such that said guide wheel contacts said wheel means to maintain a predetermined clearance between said wheel means and said lever.

11. The improved wheelchair of claim 4 wherein said support means includes a stop means for limiting the movement of said handle.

* * * * *